United States Patent Office 2,968,671
Patented Jan. 17, 1961

2,968,671

VINYL 2-ETHYLHEXYL CHLORENDATE

David Rubinstein, Brookline, and Elmar K. Wilip, Cambridge, Mass., assignors to W. R. Grace & Co., Cambridge, Mass., a corporation of Connecticut No Drawing. Filed Dec. 31, 1958, Ser. No. 784,046

1 Claim. (Cl. 260—468)

This invention is directed to vinyl 2-ethylhexyl chlorendate (vinyl 2-ethylhexyl ester of 1,4,5,6,7,7-hexachlorobicyclo-[2.2.1]-5-heptene-2,3-dicarboxylic acid) having the structure

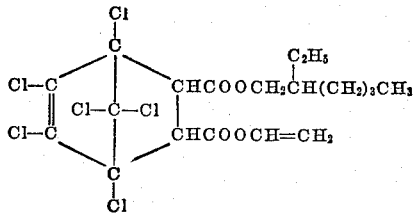

This new compound is a viscous liquid having a very high boiling point. Polymers of vinyl 2-ethylhexyl chlorendate have been found to be valuable as internal plasticizers for vinyl chloride and other vinyl resins.

The compound of this invention is conveniently made by the so-called "vinyl interchange" reaction, in which vinyl esters may be prepared by reacting vinyl acetate with the desired carboxylic acid in the presence of a catalyst, usually a mercuric salt.

In the preferred method of preparing the new compound of this invention, mono-2-ethylhexyl chlorendate is reacted with a large excess of vinyl acetate in the presence of mercuric sulfate. The reaction is allowed to proceed at room temperature and at normal atmospheric pressure for about four to five days, after which the mixture is refluxed for three days. About 70% of the monobasic acid is converted to its vinyl ester.

The following example depicts a representative preparation of the new compound of this invention.

*Example 1*

Mono-2-ethylhexyl chlorendate was prepared by heating 371 g. (about 1 mole) of chlorendic anhydride with 130 g. (about 1 mole) of 2-ethylhexanol-1 at 130° C. for 2 hours.

To 1032 g. (about 12 moles) of vinyl acetate there were added 0.1 g. copper resinate (polymerization inhibitor) and 1.2 g. mercuric acetate, and the mixture was cooled to 0° C. An amount of concentrated surfuric acid (0.3 ml.) approximately equivalent to the mercuric acetate was slowly stirred into the mixture, followed by the addition of 500 g. (about 1 mole) of mono-2-ethylhexyl chlorendate. The mixture was allowed to stand for 4 days at 30° C., after which it was refluxed for 3 days. When a sample was analyzed, 70% of the mono-2-ethylhexyl chlorendate was found to have been converted to vinyl 2-ethylhexyl chlorendate. The sulfuric acid was then neutralized with 2.5 g. of sodium acetate trihydrate dissolved in 5 ml. of water and the excess of vinyl acetate together with the acetic acid formed during the reaction were removed by flash distillation. Unreacted mono-2-ethylhexyl chlorendate remaining in the mixture was neutralized by washing with a 0.1 N sodium hydroxide solution until the wash remained alkaline. The vinyl 2-ethylhexyl chlorendate was then extracted with ether, after which the ether extract was washed with water and dried over magnesium sulfate and the ether was removed by flash distillation.

Vinyl 2-ethylhexyl chlorendate can be polymerized, for example, by mixing it with a small amount of dicumyl peroxide and heating to 185° C. for 3 minutes. The very tacky solid polymer which results has been found to be useful as an internal plasticizer in vinyl chloride and other vinyl resin compositions.

We claim:

Vinyl 2-ethylhexyl chlorendate.

References Cited in the file of this patent

UNITED STATES PATENTS 2,810,712    Baranauckas _____ Oct. 22, 1957